(12) United States Patent
Cox et al.

(10) Patent No.: US 8,576,772 B2
(45) Date of Patent: *Nov. 5, 2013

(54) COOPERATIVE MULTIPLE ACCESS IN WIRELESS NETWORKS

(75) Inventors: Timothy Cox, Palo Alto, CA (US); Ahmad Khoshnevis, Portland, OR (US)

(73) Assignee: Intel Corporation, Santa Clara, CA (US)

(*) Notice: Subject to any disclaimer, the term of this patent is extended or adjusted under 35 U.S.C. 154(b) by 1721 days.

This patent is subject to a terminal disclaimer.

(21) Appl. No.: 11/820,160

(22) Filed: Jun. 18, 2007

(65) Prior Publication Data

US 2008/0310405 A1 Dec. 18, 2008

(51) Int. Cl.
*H04W 4/00* (2009.01)

(52) U.S. Cl.
USPC .......................................... 370/328; 370/351

(58) Field of Classification Search
None
See application file for complete search history.

(56) References Cited

U.S. PATENT DOCUMENTS

| | | | |
|---|---|---|---|
| 7,380,193 B1* | 5/2008 | Shalvi | 714/746 |
| 7,406,060 B2* | 7/2008 | Periyalwar et al. | 370/328 |
| 7,623,589 B2 | 11/2009 | Oyman et al. | |
| 2006/0120477 A1 | 6/2006 | Shen et al. | |
| 2007/0010196 A1* | 1/2007 | Periyalwar et al. | 455/7 |
| 2007/0115864 A1* | 5/2007 | Bar-Ness et al. | 370/278 |
| 2007/0183533 A1* | 8/2007 | Schmidl et al. | 375/299 |
| 2008/0165880 A1* | 7/2008 | Hyon et al. | 375/267 |
| 2008/0282133 A1* | 11/2008 | Lo et al. | 714/786 |
| 2009/0268662 A1* | 10/2009 | Larsson et al. | 370/328 |

FOREIGN PATENT DOCUMENTS

WO 2008/157147 A1 12/2008

OTHER PUBLICATIONS

Cao et al. Cooperative Coding using Serial Concatenated Convolutional Codes. IEEE. 2005. pp. 1001-1006.*
Oyman, Ozgur, et al., "Cooperative Multiple-Access Using User-Clustering and Space-Time-Frequency Coding Techniques for Higher Reliability Reception", U.S. Application filed Jul. 14, 2006 assigned U.S. Appl. No. 11/487,115.
Sendonaris, Andrew, et al., "Increasing Uplink Capacity via User Cooperation Diversity", *IEEE*, (1998),1 page.
Nosratinia, Aria et al., "Cooperative Communication in Wireless Networks", *IEEE Communications Magazine*, (Oct. 2004), 74-80 pgs.
Yuan, Y. et al., "A Novel Cluster-Based Cooperative MIMO Scheme for Multi-Hop Wireless Sensor Networks", *EURASIP Journal on Wireless Communications and Networking*, vol. 2006, Article ID 72493,(2006), 1-9 pgs.
Coso, A. D., et al., "Cooperative Distributed MIMO Channels in Wireless Sensor Networks", *IEEE Journal on Selected Areas in Communications*, vol. 25, No. 2 (Feb. 2007), 402-414 pgs.
Office Action Received for Chinese Patent Application No. 200880020673, Mailed on Sep. 6, 2012, 3 pages of Office Action and 4 pages of English Translation.

(Continued)

*Primary Examiner* — Chirag Shah
*Assistant Examiner* — Jenkey Van
(74) *Attorney, Agent, or Firm* — Cool Patent, P.C.; Kenneth J. Cool; Joseph P. Curtin

(57) ABSTRACT

A cooperative cluster of wireless nodes exchange data before cooperatively communicating with a destination node over a MIMO channel. In a cooperative cluster of M nodes, each node shares 1/M of its own data with each of the other nodes, and keeps 1/M of its own data for transmission. Each node receives 1/M of data from each cooperative node. The data is merged at each cooperative node, and transmitted to the destination node.

16 Claims, 6 Drawing Sheets

(56) References Cited

OTHER PUBLICATIONS

International Search Report and Written Opinion Received for PCT Patent Application No. PCT/US2008/066478, Mailed on Nov. 18, 2006, 10 pages.

International Preliminary Report on Patentability Received for PCT Patent Application No. PCT/US2008/066478, Mailed on Jan. 7, 2010, 6 pages.

Office Action Received for Chinese Patent Application No. 200880020673.6, Mailed on Feb. 22, 2012, 8 pages of office Action including 5 pages of English Translation.

* cited by examiner

COOPERATIVE MULTIPLE ACCESS IN WIRELESS NETWORKS

FIELD

The invention relates generally to wireless communication and, more particularly, to techniques for providing multiple access in a wireless system.

BACKGROUND

Wireless communication systems are experiencing an explosive growth in popularity and the demand for wireless services is increasing. As such, it is envisioned that the data rates of future wireless systems will have to increase significantly. One performance-enhancing technology that has been successfully used in wireless systems is multiple input, multiple output or MIMO. In a MIMO system, multiple antennas are used at each side of a wireless communication link. Thus, a transmitting device uses multiple transmit antennas to transmit data to a receiving device and the receiving device uses multiple receive antennas to receive the transmitted data. The use of MIMO technology is capable of improving spectral efficiency, link reliability, and power efficiency in a system by providing spatial-multiplexing gain, diversity gain, and array gain, respectively. As described above, however, MIMO typically requires each device in the system to have multiple antennas. In some systems, it is impractical to provide multiple antennas within each communication device. Techniques are needed that allow the advantages of MIMO to be achieved within systems using single-antenna devices.

DESCRIPTION OF EMBODIMENTS

Figure 1:
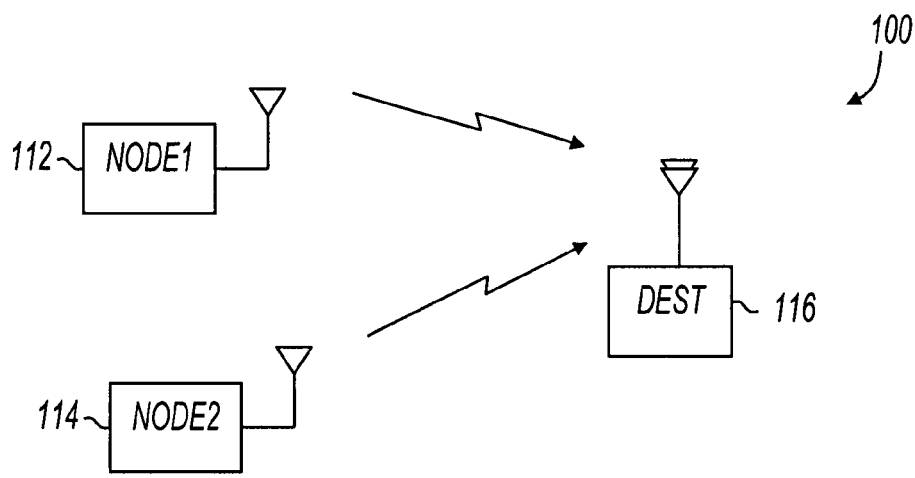
FIG. 1 shows two source nodes communicating with a destination node.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The present invention relates to techniques for providing cooperative operation among wireless devices within a network to increase the number of antennas that are used to transmit data to a remote wireless entity. In this manner, multiple single-antenna devices may cooperate with one another to appear as a single multiple-antenna device so that many of the benefits of MIMO operation may be achieved. The inventive techniques may be implemented by both single-antenna and multiple-antenna devices. In addition, the inventive techniques may be used within wireless local area networks (LANs), wireless wide area networks (WANs), wireless municipal area networks (MANs), local multipoint distribution service (LMDS) systems, multichannel multipoint distribution service (MMDS) systems, wireless cellular telephone networks, terrestrial wireless communication networks, satellite communication networks, and/or other types of wireless systems and networks.

FIG. 1 shows two source nodes communicating with a destination node within wireless network arrangement 100. As shown, first and second wireless source nodes 112, 114 are each communicating with destination node 116 in a multiple access relationship. Destination node 116 has finite communication resources available to it for use in servicing the source nodes and must allocate these resources amongst the current nodes (users). Resources may be allocated in a variety of different ways in a multiple access system. Some techniques for allocating resources include time division multiple access (TDMA) in which one or more time slots are allocated to each active user, frequency division multiple access (FDMA) in which one or more frequency channels are allocated to each user, code division multiple access (CDMA) in which one or more spread spectrum codes may be allocated to each user, orthogonal frequency division multiple access (OFDMA) in which a subgroup of subcarriers may be allocated to each user, spatial division multiple access (SDMA) in which a common resource may be allocated to two different users concurrently as long as spatially separated antenna beams are used for the two users, and carrier sense multiple access with collision avoidance (CSMA-CA) in which users first check to see if a medium is currently busy, transmit if it is not busy, and re-transmit if a collision occurs. Combinations of the above techniques may also be used. All of these techniques require the different users to "compete" for available resources.

The present invention relates to a technique that will be referred to herein as cooperative multiple access. Cooperative multiple access allows multiple users to form cooperative clusters that communicate as a single entity with a remote destination device (e.g., a base station, an access point, etc.). By cooperating with one another, the devices in the cluster are no longer in competition with each other for communication resources. Instead, the cooperating devices are assigned a single-resource allocation that they may use cooperatively as if they were a single device. Even if the cooperating devices are single-antenna devices, the cooperative arrangement allows the devices to achieve many of the benefits of MIMO-based wireless operation (e.g., spatial-multiplexing gain, diversity gain, array gain, etc.). The cooperating devices within a cluster may include all single-antenna devices, all multi-antenna devices, or a combination of single- and multi-antenna devices.

Figure 2:
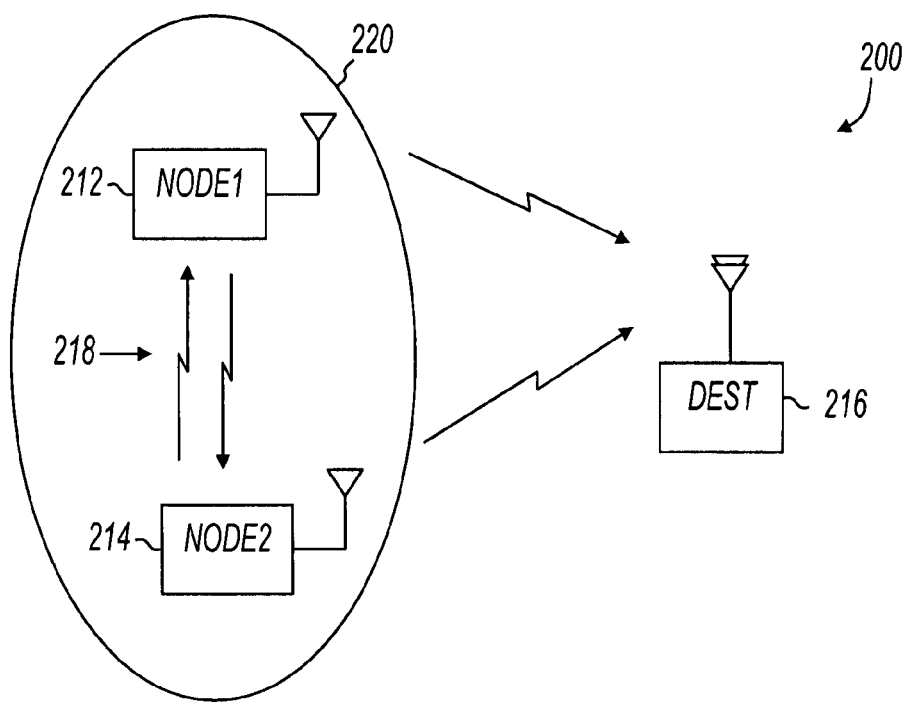
FIG. 2 shows two source nodes cooperatively communicating with a destination node.

FIG. 2 shows two source nodes cooperatively communicating with a destination node. As shown, first and second wireless nodes 212, 214 have affiliated with one another as a cooperative cluster 220 to communicate with a remote wireless destination node 216. As will be described in greater detail, the cooperating devices 212, 214 may communicate with one another via intra-cluster wireless links 218. The cluster 220 may then transmit data to the destination node 216 as a single MIMO type unit, via a MIMO channel. This technique may be referred to as MIMO-single user (MIMO-SU). The cluster 220 may utilize a common time/frequency resource allocated by the destination node 216 (resource allocation techniques, such as, for example, OFDMA, OFDM-TDMA, and/or others may be used). After reception, destination node 216 may demodulate and decode the data from the cluster 220 and separate out the data associated with each of the cooperating devices 212, 214. In at least one embodiment, the receiver within node 216 uses a conventional MIMO receiver design. Node 216 may be able to support other non-cooperating wireless devices and/or other clusters at the same time that it is supporting the cooperative cluster 220.

In various embodiments of the present invention, the cooperative communications process is broken down into two phases. In the first phase, the cooperating nodes exchange data destined for the destination node. This phase is considered as in-band cooperation overhead, because no useful information is conveyed to the destination node. In the second phase, all the participating cooperating nodes send data to the destination node, such that all the transmitted packets by cooperative nodes are coherently combined at the destination node. Various embodiments of the invention reduce the overhead associated with the first phase of the cooperative process by exchanging less than all data that is destined for the destination node. Cooperative message exchange of less than all data between two cooperative nodes is further described below with reference to FIG. 3.

Figure 3:
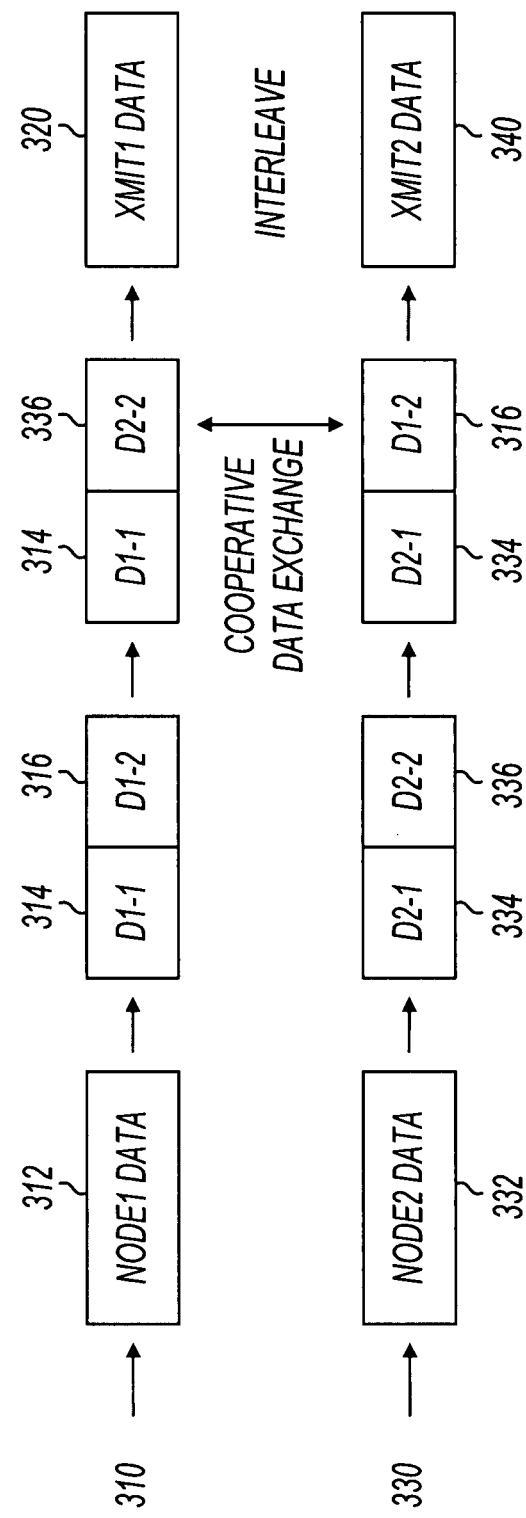
FIG. 3 shows data exchange between two cooperating nodes.

FIG. 3 shows data exchange between two cooperating nodes. Data and operations at a first wireless network node are shown generally at 310 and data and operations at a second wireless network node are shown generally at 330. For example, the data shown at 310 may be data generated or operated on by source node 212 (FIG. 2), and the data shown at 330 may be data generated or operated on by source node 214 (FIG. 2). Data packet 312 includes data generated by the first wireless network node that is to be transmitted to a destination node. Likewise, data packet 332 includes data generated by the second wireless network node that is to be transmitted to the same destination node.

The first node divides data packet 312 into two parts, D1-1 and D1-2, shown at 314 and 316, respectively. Likewise, the second node divides data packet 332 into two parts, D2-1 and D2-2, shown at 334 and 336, respectively. Each node then provides half of its data to the cooperating node. For example, as shown in FIG. 3, D2-2 is transmitted from the second node to the first, and D1-2 is transmitted from the first node to the second. The combination of D1-1 and D2-2 are interleaved and encoded as desired to become transmit data packet 320, and the combination of D2-1 and D1-2 are interleaved and encoded as desired to become transmit data packet 340. The first node transmits data packet 320 and the second node transmits data packet 340.

In the two-node cooperative system example of FIGS. 2 and 3, the receiver de-interleaves and decodes the data packets after reception. After de-interleaving and decoding, the receiver has two packets, each consisting of two separate parts. One packet includes data from the first node (D1-1) and data from the second node (D2-2). Likewise, the other packet includes the remaining data from the two nodes (D2-1, D1-2).

As shown in the two-node example, each cooperating node transmits less than all of its data to the cooperating node. In some embodiments, each of the two nodes transmits half of its data to the cooperating node. This reduces the time spent in the first phase of the cooperative multiple access. Example embodiments that include more than two cooperating nodes are described further below.

Figure 4:
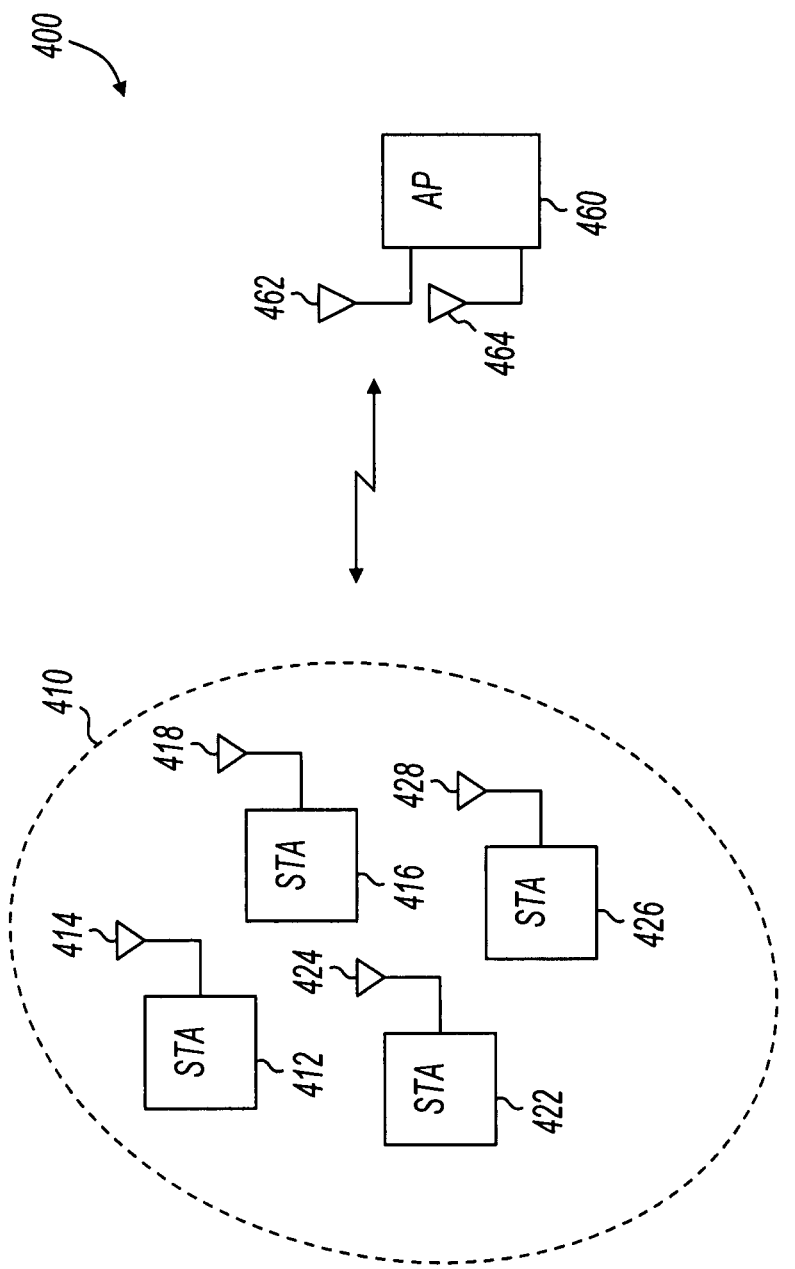
FIG. 4 shows a wireless network with multiple stations using cooperative multiple access.

FIG. 4 is a block diagram illustrating an example cooperative multiple access wireless network arrangement 400 in accordance with an embodiment of the present invention. As shown, the arrangement 400 includes a number of wireless network stations (STA) 412, 416, 422, and 426 that are acting cooperatively as a cooperative cluster 410. The cluster 410 is communicating with a remote wireless access point (AP) 460 through a MIMO channel. The access point 460 may include, for example, any other type of wireless device or system that communicates with multiple external wireless devices simultaneously. The access point 460 includes multiple antennas 462, 464. Any number of antennas may be used. In addition to the cluster 410, the access point 460 may be communicating with other devices and/or clusters concurrently. Any type of wireless network stations may be formed into a cluster including, for example, computers having wireless capability, personal digital assistants (PDAs) having wireless capability, cellular telephones and other handheld wireless communicators, and/or others. In addition, in at least one embodiment, a single cooperative cluster may include different types of wireless user devices. For example, a cluster may include a cellular telephone and a PDA that cooperate to transmit data to a remote base station. Each wireless network station 412, 416, 422, and 426 in the cluster 410 includes at least one corresponding antenna 414, 418, 424, 428. Any type of antenna(s) may be used including, for example, a dipole, a patch, a helical antenna, and/or others.

Before a cluster 410 is able to communicate with an access point 460, the cluster must be formed. As described previously, in some embodiments, the devices within a cooperative cluster communicate with one another using intra-cluster wireless links. These intra-cluster links should be high-quality links (e.g., high signal to noise ratios (SNRs), etc.) that are capable of relatively high data rates. When high-quality links exist between the cooperating users, the users are able to exchange packets with little cost in terms of power and bandwidth. Therefore, in at least one embodiment, only wireless user devices that are capable of supporting high-quality links with one another will be allowed to form a cluster. For example, a user device may only be allowed to join a particular cluster if a channel quality parameter associated with the device satisfies a predetermined condition (e.g., a channel coefficient for a channel between the device and the other devices in the cluster is greater than a threshold value). In one possible approach, a user device may be designated as a master for a cluster to control the formation of the group. This may be, for example, a first device that indicates a desire to form a cluster. The master device may then allow other devices to join the cluster if they qualify. Measurements may be made of a channel quality of each candidate device with respect to each other device within the cluster. In some embodiments, there may be a maximum number of devices that will be permitted to join a cluster. Other techniques for establishing the cluster may alternatively be used.

In some embodiments, wireless stations in cluster 410 use the same communications resources to communicate cooperatively and to communicate with the access point 460. For example, arrangement 400 may be an 802.11 wireless network, and the stations in cluster 410 may use the same frequency channels and channel access methods for both intra-cluster communications and communications with access point 460.

In the examples discussed above, MIMO-based devices are shown that include two antennas. It should be appreciated that a device (or cluster) may include any number of antennas greater than one to support MIMO operation. A point may, however, be reached in which adding further user devices to a cluster provides no additional performance gain. The devices in a cluster may each have one or more antennas.

Any number of cooperative devices may be included within a cluster, and each node shares less than all of its data with cooperating nodes. For example, if there are a total of M cooperating nodes, each node keeps (1/M) of its own data and shares the remaining (M−1)/M of its data with other nodes. So, for example, for the case of two cooperating nodes, the final packet generated at each node uses half of its own data, and half of the other user's data. This is shown in FIGS. 2 and 3.

As compared scenarios in which all cooperating nodes share each complete packet of data with all other cooperating nodes, this procedure results in saving the transmission of one packet in the packet-exchange phase. This savings is equivalent of $t=1/C_1$ seconds of freed time, in which $C_1$ represents the packet transmission rate in packets/sec.

The extra time can be shared between the two phases in a way to preserve the amount of exchanged information. Let assume that $t=t_1+t_2$, in which $t_1$ is allocated to phase 1 and $t_2$ is allocated to phase 2. Then, each packet in the phase 1 can contain $(t_1 C_1/M)$ more information. This extra information is equal to the extra information that can be retrieved at the second phase, which is given by $(t_2 C_2)$, in which $C_2$ is the capacity of the cooperative links to the destination. Therefore, we have:

$$t = \frac{1}{C_1}$$

$$t = t_1 + t_2$$

$$t_1 \frac{C_1}{M} = t_2 C_2$$

Solving for $t_2$, we have $$t_2 = \frac{1}{MC_2 + C_1}$$

This is the extra time available during phase 2, which can be allocated for transmission of useful data. The amount of the gain is quantified by $$\Delta T = C_2 t_2 = \frac{C_2}{MC_2 + C_1}$$

Note that the gain is a monotonically decreasing function with the number of cooperating nodes M, so the largest gain is achieved when there are only 2 cooperating nodes, and the gain goes to zero as M goes to infinity.

Figure 5:
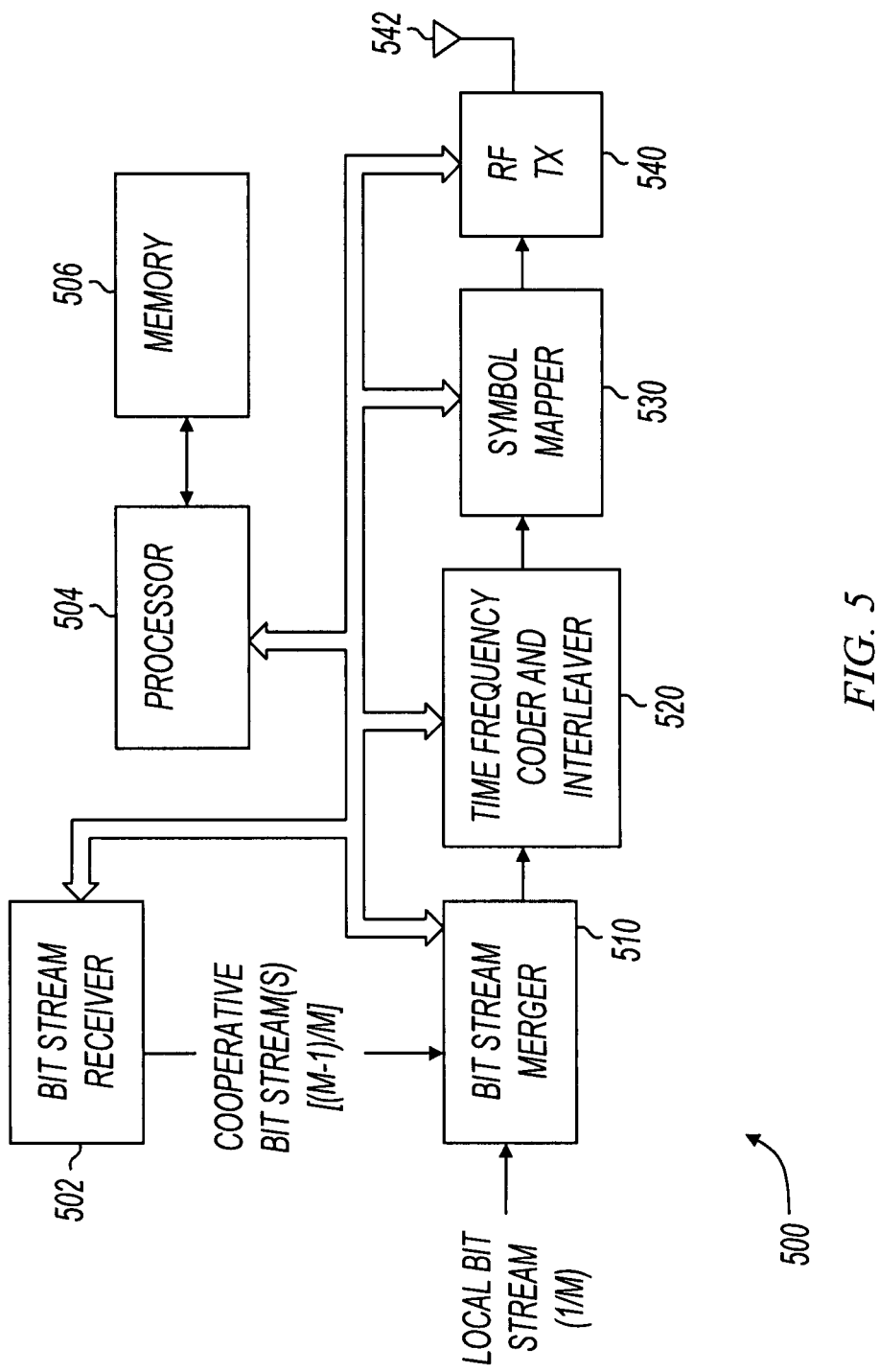
FIG. 5 shows a block diagram of a transmitting node capable of cooperative communications.

FIG. 5 shows a block diagram of a transmitting node capable of cooperative communications. The transmitter system 500 may be used within, for example, a wireless user device that is to join a cooperative cluster in a cooperative multiple access system (e.g., node 212 in FIG. 2, etc.). As shown, the transmitter system 500 may include: a bit stream receiver 502, a bit stream merger 510, a time-frequency coder and interleaver 520, a symbol mapper 530, an RF transmitter 540, a processor 504, and a memory 506. The RF transmitter 540 may be coupled to one or more antennas 542 to facilitate the transmission of signals onto the wireless channel.

In at least one embodiment of the present invention, before data is transmitted to a destination node by a cooperative cluster, the devices of the cluster exchange portions of data messages that they wish to transmit to the destination node. After this data exchange, each of the devices of the cluster have a portion of the messages of the other devices in the cluster.

Bit stream receiver 502 receives the cooperative bit streams from the cooperating nodes in the cluster. In some embodiments, bit stream receiver 502 is dedicated to operate on intra-cluster links as described above. In other embodiments, bit stream receiver 502 is a general-purpose receiver used for all signal reception. For example, system 500 may be part of a mobile user device such as a laptop computer in a wireless network, and receiver 502 and transmitter 540 may both operate to communicate in the wireless network.

The bit stream merger 510 within a particular device merges the bit streams of the other device(s) within the cooperative cluster with the bit stream of the device itself to form a merged bit stream. For example, each of M nodes in the cooperative cluster merges (1/M) of its own local bit stream with (1/M) of each bit stream for the other M−1 cooperating nodes.

Each of the other devices within the cooperative cluster also merge the bit streams together in the same fashion. A priority scheme may be established so that each device knows the order with which to merge the bit streams. The merged bit stream is next processed by the time-frequency coder and interleaver 520, which applies time-frequency coding and interleaving to the stream to generate a coded bit stream. Although illustrated as a single unit, it should be appreciated that, in at least one embodiment, the time-frequency coding and interleaving may be performed separately. Each device within the cooperative cluster will apply the identical time-frequency code at this stage.

The symbol mapper 530 receives the coded bit stream to be transmitted and maps the bits to symbols in accordance with a predetermined modulation scheme. The symbols are then delivered to the RF transmitter 540 which may upconvert the symbols and amplify them before feeding them to the antenna 542 for transmission onto the wireless channel.

In operation, processor 504 reads instructions and data from memory 506 and performs actions in response thereto. For example, processor 504 may access instructions from memory 506 and perform method embodiments of the present invention, such as method 700 (FIG. 7) or methods described with reference to other figures. Processor 504 represents any type of processor, including but not limited to, a microprocessor, a digital signal processor, a microcontroller, or the like.

Memory 506 represents an article that includes a machine-readable medium. For example, memory 506 represents a random access memory (RAM), dynamic random access memory (DRAM), static random access memory (SRAM), read only memory (ROM), flash memory, or any other type of article that includes a medium readable by processor 504. Memory 506 may store instructions for performing the execution of the various method embodiments of the present invention.

Each of the blocks shown in FIG. 5 may be implemented in hardware, software, or any combination thereof. For example, processor 504 may, through execution of instructions stored in memory 506, perform the various functions described with reference to other blocks in the figure. Also for example, each of the functional blocks may be implemented in programmable hardware or special purpose hardware.

Figure 6:
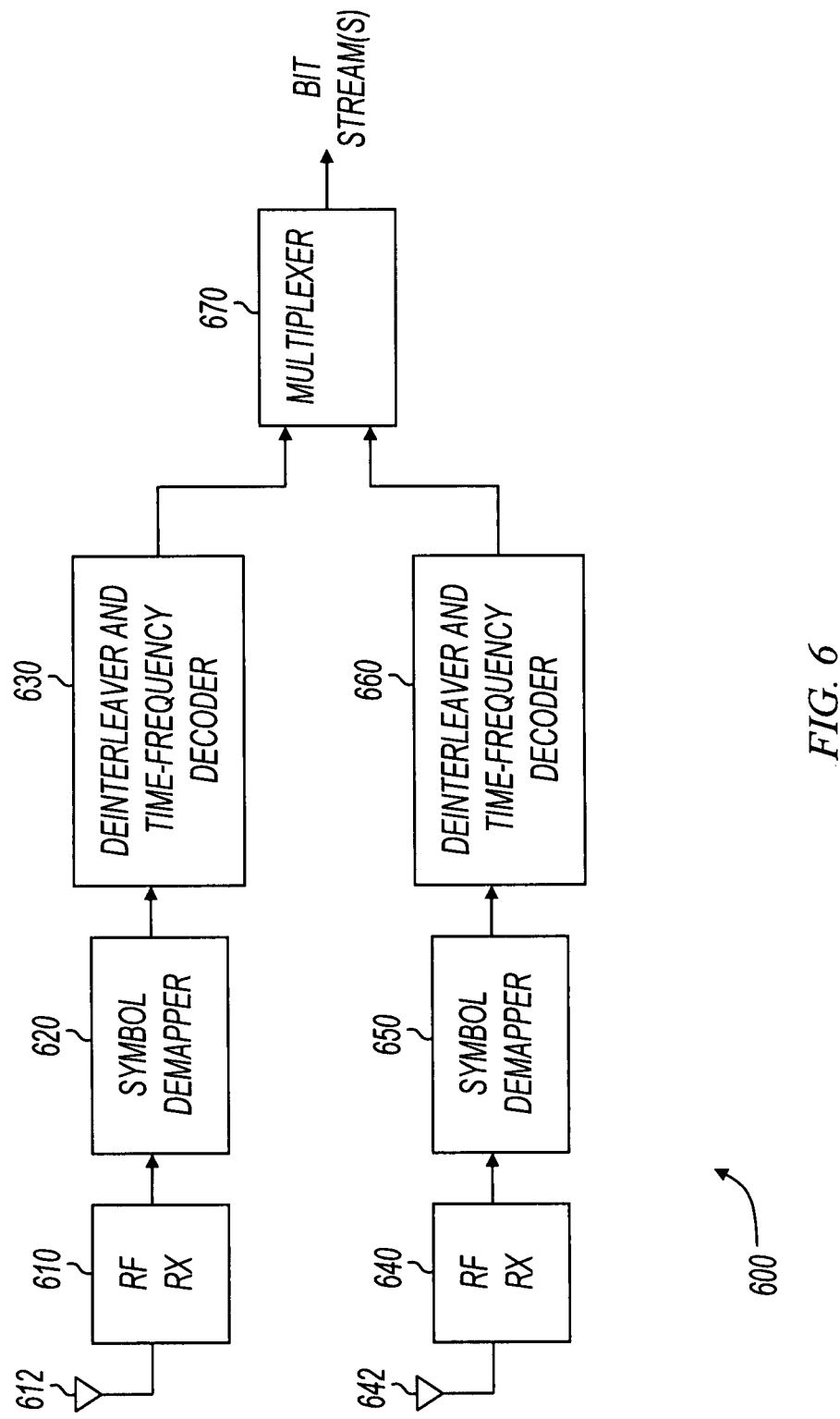
FIG. 6 shows block diagram of a receiving node capable of cooperative communications.

FIG. 6 shows a block diagram of a receiving node capable of receiving transmissions from a cooperative cluster in accordance with an embodiment of the present invention. The receiver system 600 may include: first and second RF receivers 610, 640, first and second symbol demappers 620, 650, first and second deinterleaver and time-frequency decoders 630, 660, and multiplexer 670. The first and second RF receivers 610, 640 may each be coupled to a corresponding receive antenna 612, 642 to facilitate the reception of signals from the wireless medium. When a cooperative cluster transmits signals to the receiver system 600, the first and second RF receivers 610, 640 receive the signals and convert them to a baseband representation. The first and second symbol demappers 620, 650 then demap the signals to soft bits. The first and second deinterleaver and time-frequency decoders 630, 660 generate decoded bit streams. Each of the decoded bit streams may be a merged bit stream including portions associated with each of the user devices within the originating cooperative cluster. The multiplexer 670 then multiplexes the outputs of the deinterleavers and time-frequency decoders 630, 660 into a single stream for each of the cooperating nodes.

Figure 7:
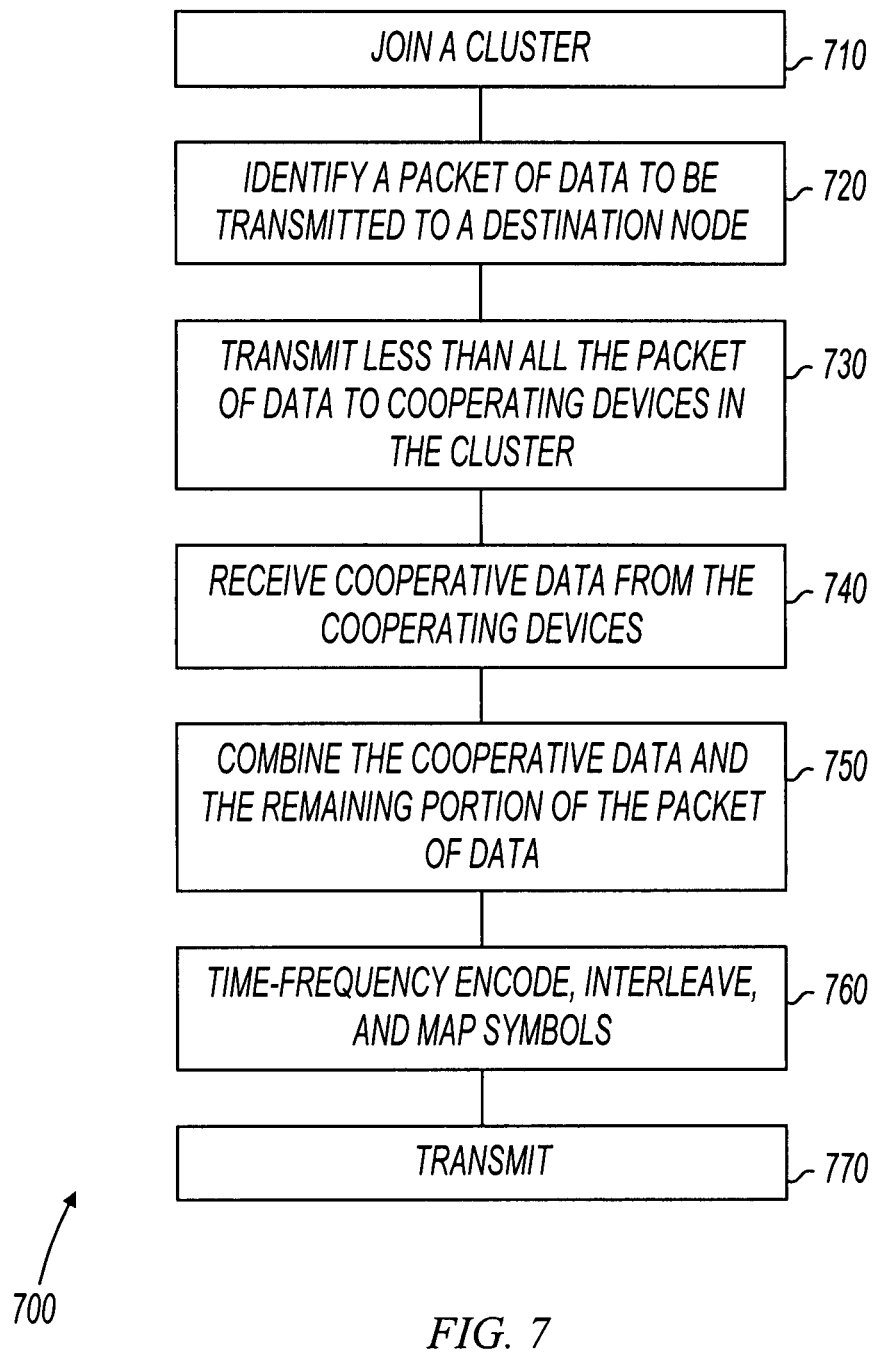
FIG. 7 shows a flowchart of methods in accordance with various embodiments of the present invention.

FIG. 7 is a flowchart illustrating an example method 700 for operating a user device in a cooperative multiple access mode in accordance with an embodiment of the present invention. First, a user device establishes or joins a cooperative cluster of user devices that need to uplink data to a remote destination node (block 710). Any number of devices (i.e., 2 or more) may be part of the cluster. After the cluster has been formed, a user device identifies a packet of data to be transmitted to a destination node (block 720). The user device transmits less than all of the data packet to the cooperating devices in the cluster (block 730). For example, in a cluster of M cooperating nodes, each node transfers a different 1/M of its data to each of the remaining M−1 cooperating nodes. Similarly, the user device may receive cooperative data from one or more (or all) of the other cooperating devices within the cluster that needs to be delivered to the destination node (block 740). The cooperative data from each of the M−1 cooperating nodes includes 1/M of the data from that node. This data transfer between cooperating nodes may be performed using intra-cluster wireless links, or may be performed using the same medium used for communications between the cluster and the destination.

The cooperative data from the cooperating devices are next combined (merged) with the remainder of the packet of data originating in the user device performing the method (block 750). The merger may be performed, for example, by concatenating the various bit streams in a predetermined manner. The same merger of cooperative data may be performed in each of the other cooperating devices to generate a unique merged bit stream within each cooperating device. The merged bit stream is then time-frequency coded, interleaved, and mapped to symbols within the user device to generate a transmit packet (block 760). The coded bit stream is then transmitted into the wireless channel (block 770).

In at least one embodiment, a different frequency band is used within the intra-cluster wireless links than is used within the MIMO channel to the destination device. In this manner, the intra-cluster communications will not generate a bandwidth penalty within the primary communication network. For example, in one possible implementation, each wireless user device within a cluster may include both an IEEE 802.11a radio and a Bluetooth radio. The Bluetooth radios may be used to support the intra-cluster links, while IEEE 802.11a radios provide communication with the remote destination node. The communications using the Bluetooth radio will not generate a bandwidth penalty within the IEEE 802.11a network. In other embodiments, the same frequency band may be used for the intra-cluster links that is used for the primary network. For example, in one possible implementation, each of the cooperating devices may include only an IEEE 802.11a radio. The devices may then use this radio for both intra-cluster communication and communication with the remote destination node. As will be appreciated, many different alternatives may be used for supporting the intra-cluster communication.

The techniques and structures of the present invention may be implemented in any of a variety of different forms. For example, features of the invention may be embodied within laptop, palmtop, desktop, and tablet computers having wireless capability; personal digital assistants (PDAs) having wireless capability; cellular telephones and other handheld wireless communicators; pagers; satellite communicators; cameras having wireless capability; audio/video devices having wireless capability; network interface cards (NICs) and other network interface structures; base stations; wireless access points; integrated circuits; as instructions and/or data structures stored on machine readable media; and/or in other formats. Examples of different types of machine readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data. In at least one form, the invention is embodied as a set of instructions that are modulated onto a carrier wave for transmission over a transmission medium. As used herein, the term "logic" may include, by way of example, software or hardware and/or combinations of software and hardware.

It should be appreciated that the individual blocks illustrated in the block diagrams herein may be functional in nature and do not necessarily correspond to discrete hardware elements. For example, in at least one embodiment, two or more of the blocks in a diagram are implemented in software within a single digital processing device. The digital processing device may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. Hardware, software, firmware, and hybrid implementations may be used.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

What is claimed is:

1. A method for use with a wireless user device, the method comprising:

identifying a first packet of data to be communicated from the wireless user device to a destination node, the first packet of data comprising M parts, and the wireless user device comprising part of a cooperative cluster comprising M cooperating wireless user devices including the wireless user device in which M is an integer greater than 2;

transmitting a different part of the first packet of data to of the M−1 other cooperating wireless user devices in the cluster, one of the M parts of the first packet of data remaining with the wireless user device;

receiving cooperative data from the at least one of the M−1 other cooperating wireless user devices in the cluster;

combining the received cooperative data and the remaining part of the first packet of data to form a transmit packet; and transmitting the transmit packet to the destination node.

2. The method of claim 1, wherein transmitting the different parts part of the first packet to each of the M−1 other cooperating wireless user devices and transmitting the transmit packet comprise transmitting in the same frequency spectrum.

3. The method of claim 1, wherein transmitting the different parts part of the first packet to each of the M−1 other cooperating wireless user devices and transmitting the transmit packet comprise transmitting in different frequency spectrum.

4. The method of claim 1, wherein receiving cooperative data comprises receiving one part of one packet of data from each of the M−1 other cooperating wireless user devices.

5. The method of claim 1, further comprising joining the cooperative cluster prior to transmitting the different parts of the first packet of data to each of the M−1 other cooperating wireless user devices.

6. A method for use with a wireless user device, the method comprising:

identifying a first packet of data to be communicated from the wireless user device to a destination node, the first packet of data comprising M portions, and the wireless user device comprising part of a cluster comprising M cooperating wireless user devices including the wireless user device in which M is an integer greater than 2;

transmitting a different portion of the first packet of data to each of the other cooperating wireless user devices in the cluster, one of the M portions of the first packet of data remaining with the wireless user device;

receiving cooperative data from the other cooperating wireless user devices in the cluster;

combining the received cooperative data and the remaining portion of the first packet of data to form a transmit packet; and transmitting the transmit packet to the destination node.

7. The method of claim 6, wherein receiving comprises receiving 1/M of the cooperative data from each of the M−1 other cooperating wireless user devices.

8. The method of claim 6, wherein combining further comprises interleaving.

9. A wireless device, comprising:

a processor to identify a first packet of data to be communicated from the wireless device to a destination node, the first packet of data comprising M parts, and the wireless device comprising part of a cooperative cluster comprising M cooperating wireless devices including the wireless device in which M is an integer greater than 2;

a transmitter to transmit a different part of the first packet of data to each of the M−1 other cooperating wireless devices in the cluster, one of the M parts of the first packet of data remaining with the wireless device;

a receiver to receive 1/M of a data packet from each of M−1 cooperating wireless devices in a cooperative cluster; and the transmitter to further transmit symbols corresponding to the merged bit stream.

10. The wireless device of claim 9, further comprising an interleaver to interleave the merged bit stream.

11. The wireless device of claim 10, further comprising a time-frequency coder to encode the merged bit stream.

12. The wireless device of claim 9, wherein the wireless device comprises a wireless network station (STA).

13. The wireless device of claim 9, wherein the wireless device comprises a laptop computer.

14. The wireless device of claim 9, further comprising a patch antenna.

15. An article having a non-transitory machine-readable medium with instructions stored thereon that when accessed result in a wireless user device:

identifying a first packet of data to be communicated from the wireless user device to a destination node, the first packet of data comprising M portions, and the wireless user device comprising part of a cluster comprising M cooperating wireless user devices including the wireless user device in which M is an integer greater than 2;

transmitting a different portion of the first packet of data to each of the M−1 other cooperating wireless user devices in the cluster, one of the M portions of the first packet of data remaining with the wireless user device;

receiving cooperative data from the at least one of the M−1 other cooperating wireless user devices;

combining the cooperative data and the remaining portion of the first packet of data to form a transmit packet; and transmitting the transmit packet to the destination node.

16. The article of claim 15, wherein receiving comprises receiving 1/M of the cooperative data from each of the at least one of the M−1 other cooperating wireless user devices.

* * * * *

UNITED STATES PATENT AND TRADEMARK OFFICE
CERTIFICATE OF CORRECTION

PATENT NO.         : 8,576,772 B2                                Page 1 of 1
APPLICATION NO.    : 11/820160
DATED              : November 5, 2013
INVENTOR(S)        : Timothy Cox et al.

It is certified that error appears in the above-identified patent and that said Letters Patent is hereby corrected as shown below:

In the Claims

In column 9, line 8, in claim 1, after "to" insert -- each --.

In column 9, line 20, in claim 2, after "parts" delete "part".

In column 9, line 25, in claim 2, after "parts" delete "part".

In column 9, line 45, in claim 6, after "the" insert -- M-1 --.

In column 9, line 48, in claim 6, after "the" insert -- M-1 --.

In column 10, line 19, in claim 9, below "and" insert -- a bit stream merger unit to merge the data received from the cooperating wireless devices with 1/M of a data packet originating from the wireless device to form a merged bit stream; and --.

Signed and Sealed this
Third Day of June, 2014

Michelle K. Lee
*Deputy Director of the United States Patent and Trademark Office*